(12) United States Patent
Nageshkar et al.

(10) Patent No.: US 11,001,141 B2
(45) Date of Patent: May 11, 2021

(54) JOYSTICK FOR VEHICLE

(71) Applicant: Ford Global Technologies, LLC, Dearborn, MI (US)

(72) Inventors: Vishal Vinayak Nageshkar, Farmington Hills, MI (US); Sangram Tamhankar, Canton, MI (US); Jonathan Paul Weiler, Detroit, MI (US); Christian J. Hosbach, Taylor, MI (US); Patrick Maloney, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 186 days.

(21) Appl. No.: 16/531,190

(22) Filed: Aug. 5, 2019

(65) Prior Publication Data

US 2021/0039494 A1 Feb. 11, 2021

(51) Int. Cl.
| | |
|---|---|
| *B60K 26/02* | (2006.01) |
| *B62D 1/12* | (2006.01) |
| *B60T 7/10* | (2006.01) |
| *B60K 37/06* | (2006.01) |
| *G05D 1/00* | (2006.01) |

(Continued)

(52) U.S. Cl.
CPC .............. *B60K 26/02* (2013.01); *B60K 37/06* (2013.01); *B60T 7/102* (2013.01); *B62D 1/12* (2013.01); *G05D 1/0061* (2013.01); *B60K 31/00* (2013.01); *B60K 2026/029* (2013.01); *B60K 2370/131* (2019.05); *B60K 2370/143* (2019.05); *B60Q 1/0076* (2013.01); *B60S 1/06* (2013.01); *G05D 1/0088* (2013.01)

(58) Field of Classification Search
CPC .............. B60K 26/02; B60K 2026/029; B60K 2026/025; B60K 37/06; B60K 2370/143; B60K 2370/131; B60K 31/00; B62D 1/12; B60T 7/102; G05D 1/0061; G05D 1/0088; B60S 1/06; B60Q 1/1476; B60Q 1/0076
See application file for complete search history.

(56) References Cited

U.S. PATENT DOCUMENTS

| | | | |
|---|---|---|---|
| 2,330,646 | A | 9/1943 | Voigt et al. |
| 2,791,664 | A | 5/1957 | Rohacs |

(Continued)

FOREIGN PATENT DOCUMENTS

| | | |
|---|---|---|
| DE | 19647460 A1 | 5/1998 |
| WO | 2017001898 A1 | 1/2017 |

*Primary Examiner* — Richard M Camby
(74) *Attorney, Agent, or Firm* — Frank A. MacKenzie; Bejin Bieneman PLC (57) ABSTRACT

A control system includes a joystick and a computer. The joystick includes a joystick body, a cover hingedly coupled to the joystick body and movable between an open position and a closed position, and an input located on the joystick body. The input is exposed by the cover when the cover is in the open position and concealed by the cover when the cover is in the closed position. The computer is programmed to enter a first mode in response to the cover moving from the open position to the closed position, to enter a second mode in response to both the cover moving from the closed position to the open position and the input being activated, and to remain in a same of the first and second modes in response to the cover moving from the closed position to the open position without the input being activated.

19 Claims, 7 Drawing Sheets

(51) Int. Cl.
 *B60S 1/06* (2006.01)
 *B60K 31/00* (2006.01)
 *B60Q 1/00* (2006.01)

(56) References Cited

U.S. PATENT DOCUMENTS

| | | |
|---|---|---|
| 3,142,227 A | 7/1964 | Stringer |
| 3,198,922 A | 8/1965 | Rohacs |
| 4,355,694 A | 10/1982 | Igarashi |
| 4,360,718 A * | 11/1982 | Schobinger ............ F16H 59/044 |
| | | 200/61.88 |
| 4,399,340 A * | 8/1983 | Crandall ................. H01H 3/20 |
| | | 200/334 |
| 4,585,510 A * | 4/1986 | Hadjiskakis ........... A41H 43/04 |
| | | 156/555 |
| 5,161,679 A | 11/1992 | Russo |
| 6,038,937 A * | 3/2000 | Van Order ............ F16H 59/105 |
| | | 200/61.85 |
| 6,072,131 A | 6/2000 | Dorey |
| 6,928,350 B2 | 8/2005 | Melnyk et al. |
| 7,271,796 B1 * | 9/2007 | Moll ...................... G05G 25/02 |
| | | 244/234 |
| 8,835,781 B2 * | 9/2014 | Dixon ................... H01H 9/287 |
| | | 200/43.16 |

* cited by examiner

JOYSTICK FOR VEHICLE

BACKGROUND

Some vehicles are autonomous vehicles. A computer can be programmed to operate such a vehicle independently of the intervention of a human driver, completely or to a lesser degree. The computer can be programmed to operate the propulsion, brake system, steering, and/or other vehicle systems. In an autonomous mode, the computer controls the propulsion, brake system, and steering without input from a human driver; in a semi-autonomous mode, the computer controls one or two of the propulsion, brake system, and steering and a human driver controls the remainder; and in a nonautonomous mode, a human driver controls the propulsion, brake system, and steering.

DETAILED DESCRIPTION

A control system includes a joystick and a computer communicatively coupled to the joystick. The joystick includes a joystick body, a cover hingedly coupled to the joystick body and movable between an open position and a closed position, and an input located on the joystick body, and the input is exposed by the cover when the cover is in the open position and concealed by the cover when the cover is in the closed position. The computer is programmed to enter a first mode in response to the cover moving from the open position to the closed position, to enter a second mode in response to both the cover moving from the closed position to the open position and the input being activated, and to remain in a same of the first and second modes in response to the cover moving from the closed position to the open position without the input being activated.

The computer may be further programmed to disregard movement of the joystick body when the computer is in the first mode.

The computer may be further programmed to autonomously operate a vehicle when the computer is in the first mode.

The computer may be further programmed to operate a vehicle in response to movement of the joystick body when the computer is in the second mode. The computer may be further programmed to operate a propulsion, a brake system, and a steering system of the vehicle in response to tilting movement of the joystick body when the computer is in the second mode.

The input may be one of a button, a switch, or a touch-sensitive surface.

The input may be a first input, the joystick may include a second input located on the joystick body, and the second input is exposed by the cover when the cover is in the open position and concealed by the cover when the cover is in the closed position. The computer may be further programmed to, in response to activation of the second input, actuate a light of a vehicle, wipers of the vehicle, or a cruise control of the vehicle.

The joystick may include a spring extending from the joystick body to the cover, and the spring may be positioned to bias the cover to the open position when the cover is in the closed position.

The joystick body may have a longest length defining a longitudinal axis, and the cover may be rotatable relative to the joystick body around a rotation axis that is transverse to the longitudinal axis.

The joystick body may have a longest length defining a longitudinal axis, and the cover may intersect the longitudinal axis when the cover is in the closed position and may be spaced from the longitudinal axis when the cover is in the open position.

The control system may further include a seat rotatable about a vertical axis, the joystick may include a base fixed relative to the seat, and the joystick body may be mounted to and tiltable relative to the base.

The control system may further include an instrument panel, the joystick may include a base fixed relative to the instrument panel, and the joystick body is mounted to and tiltable relative to the base.

A computer includes a processor and a memory storing instructions executable by the processor to enter a first mode in response to a cover hingedly coupled to a joystick body moving from an open position to a closed position; enter a second mode in response to both the cover moving from the closed position to the open position and an input located on the joystick body being activated, wherein the input is exposed by the cover when the cover is in the open position and concealed by the cover when the cover is in the closed position; and remain in a same of the first and second modes in response to the cover moving from the closed position to the open position without the input being activated.

The instructions may further include to disregard movement of the joystick body when the computer is in the first mode.

The instructions may further include to autonomously operate a vehicle when the computer is in the first mode.

The instructions may further include to operate a vehicle in response to movement of the joystick body when the computer is in the second mode. The instructions further include to operate a propulsion, a brake system, and a steering system of the vehicle in response to tilting movement of the joystick body when the computer is in the second mode.

A method includes putting a computer into a first mode in response to a cover hingedly coupled to a joystick body moving from an open position to a closed position; putting a computer into a second mode in response to both the cover moving from the closed position to the open position and an input located on the joystick body being activated, wherein the input is exposed by the cover when the cover is in the open position and concealed by the cover when the cover is in the closed position; and keeping the computer in a same of the first and second modes in response to the cover moving from the closed position to the open position without the input being activated.

With reference to the Figures, a control system 32 for a vehicle 30 includes a joystick 34 and a computer 36. The joystick 34 includes a joystick body 38, a cover 40 hingedly coupled to the joystick body 38 and movable between an open position and a closed position, and a first input 42 located on the joystick body 38. The first input 42 is exposed by the cover 40 when the cover 40 is in the open position and concealed by the cover 40 when the cover 40 is in the closed position. The computer 36 is communicatively coupled to the joystick 34 and programmed to enter a first mode in response to the cover 40 moving from the open position to the closed position, to enter a second mode in response to both the cover 40 moving from the closed position to the open position and the first input 42 being activated, and to remain in a same of the first and second modes in response to the cover 40 moving from the closed position to the open position without the first input 42 being activated.

The control system 32 provides a way for an occupant of the vehicle 30 to control the vehicle 30 when desired, permit the vehicle 30 to operate itself when desired, and easily switch between the two. The control system 32 provides a low likelihood of the occupant switching to the second mode accidentally while still making switching modes easy. The cover 40 of the control system 32 can hide unneeded second inputs 44 when the vehicle 30 is in the first mode and allow access to the second inputs 44 when the vehicle 30 is in the second mode. The control system 32 provides greater space in a passenger cabin 46 than a steering wheel and pedals, which can permit different layouts for the passenger cabin 46.

Figure 1:
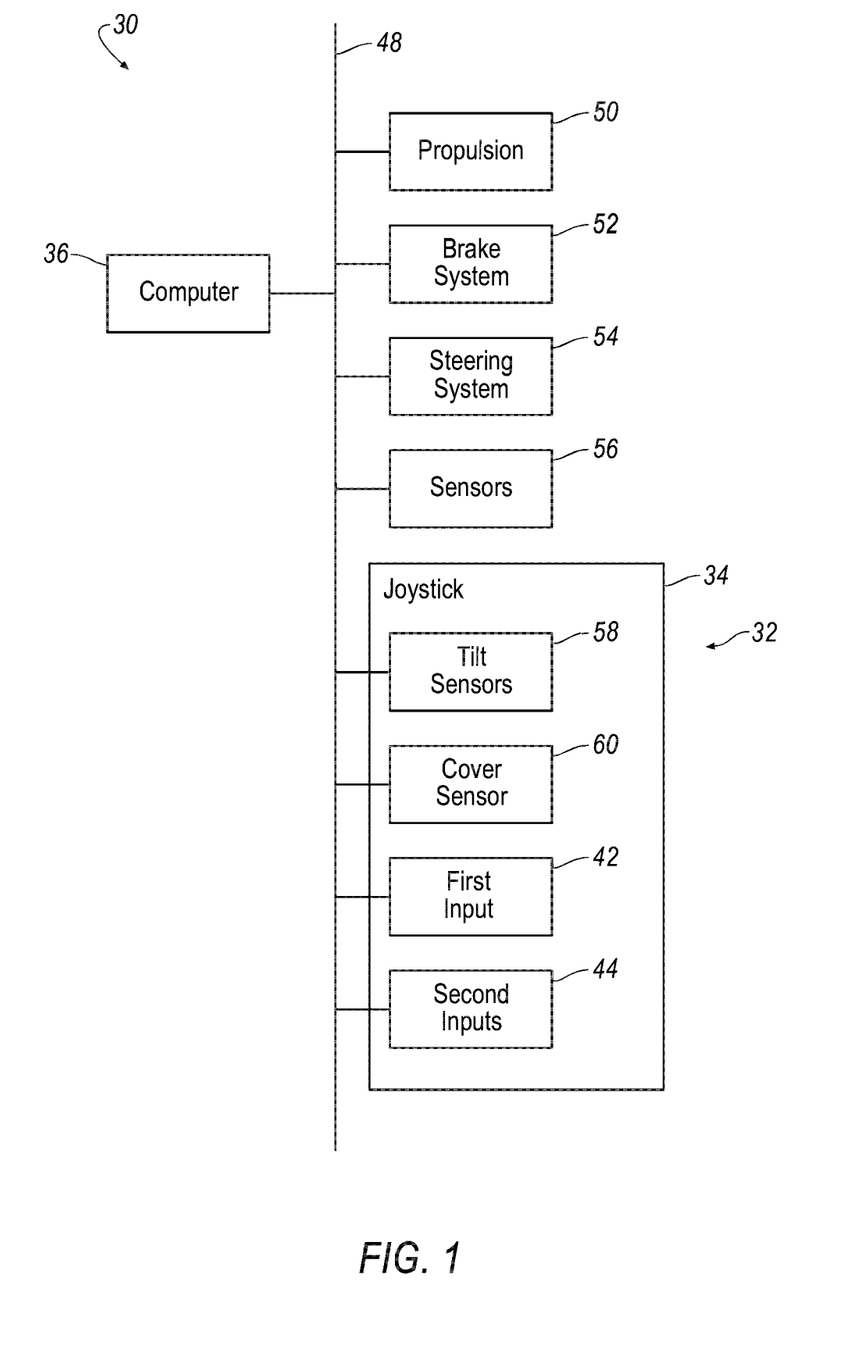
FIG. 1 is a block diagram of an example vehicle.

With reference to FIG. 1, the vehicle 30 may be any passenger or commercial automobile such as a car, a truck, a sport utility vehicle, a crossover, a van, a minivan, a taxi, a bus, etc.

The vehicle 30 is an autonomous vehicle. The computer 36 can be programmed to operate the vehicle 30 independently of the intervention of a human driver, completely or to a lesser degree. The computer 36 can be programmed to operate a propulsion 50, a brake system 52, a steering system 54, and/or other vehicle systems. The first mode of the computer 36 is an autonomous mode, and the second mode of the computer 36 is a manual mode or a semi-autonomous mode. For the purposes of this disclosure, the autonomous mode means the computer 36 controls the propulsion 50, brake system 52, and steering system 54 without input from a human driver; the semi-autonomous mode means the computer 36 controls one or two of the propulsion 50, brake system 52, and steering system 54 and a human driver controls the remainder; and the manual mode means a human driver controls the propulsion 50, brake system 52, and steering system 54.

The computer 36 is a microprocessor-based controller. The computer 36 includes a processor, a memory, etc. The memory of the computer 36 includes media for storing instructions executable by the processor as well as for electronically storing data and/or databases.

The computer 36 may transmit and receive data through a communications network 48 such as a controller area network (CAN) bus, Ethernet, WiFi, Local Interconnect Network (LIN), onboard diagnostics connector (OBD-II), and/or by any other wired or wireless communications network. The computer 36 may be communicatively coupled to the propulsion 50; the brake system 52; the steering system 54; sensors 56; the joystick 34, specifically tilt sensors 58, a cover sensor 60, the first input 42, and the second inputs 44; and other components via the communications network 48.

The propulsion 50 of the vehicle 30 generates energy and translates the energy into motion of the vehicle 30. The propulsion 50 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion 50 can include an electronic control unit (ECU) or the like that is in communication with and receives input from the computer 36 and/or a human driver. The human driver may control the propulsion 50 via the joystick 34, as described below.

The brake system 52 is typically a conventional vehicle braking subsystem and resists the motion of the vehicle 30 to thereby slow and/or stop the vehicle 30. The brake system 52 may include friction brakes such as disc brakes, drum brakes, band brakes, etc.; regenerative brakes; any other suitable type of brakes; or a combination. The brake system 52 can include an electronic control unit (ECU) or the like that is in communication with and receives input from the computer 36 and/or a human driver. The human driver may control the brake system 52 via the joystick 34, as described below.

The steering system 54 is typically a conventional vehicle steering subsystem and controls the turning of the wheels. The steering system 54 can be a steer-by-wire system. For the purposes of this disclosure, a steer-by-wire system is defined as a steering system in which at least one link from steering controls to the mechanism steering the wheels is nonmechanical, e.g., electronic. The steering system 54 can include an electronic control unit (ECU) or the like that is in communication with and receives input from the computer 36 and/or a human driver. The human driver may control the steering system 54 via the joystick 34, as described below.

The sensors 56 may provide data about operation of the vehicle 30, for example, wheel speed, wheel orientation, and engine and transmission data (e.g., temperature, fuel consumption, etc.). The sensors 56 may detect the location and/or orientation of the vehicle 30. For example, the sensors 56 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 56 may detect the external world, e.g., objects and/or characteristics of surroundings of the vehicle 30, such as other vehicles, road lane markings, traffic lights and/or signs, pedestrians, etc. For example, the sensors 56 may include radar sensors, scanning laser range finders, light detection and ranging (LIDAR) devices, and image processing sensors such as cameras. The sensors 56 may include communications devices, for example, vehicle-to-infrastructure (V2I) or vehicle-to-vehicle (V2V) devices.

Figure 2:
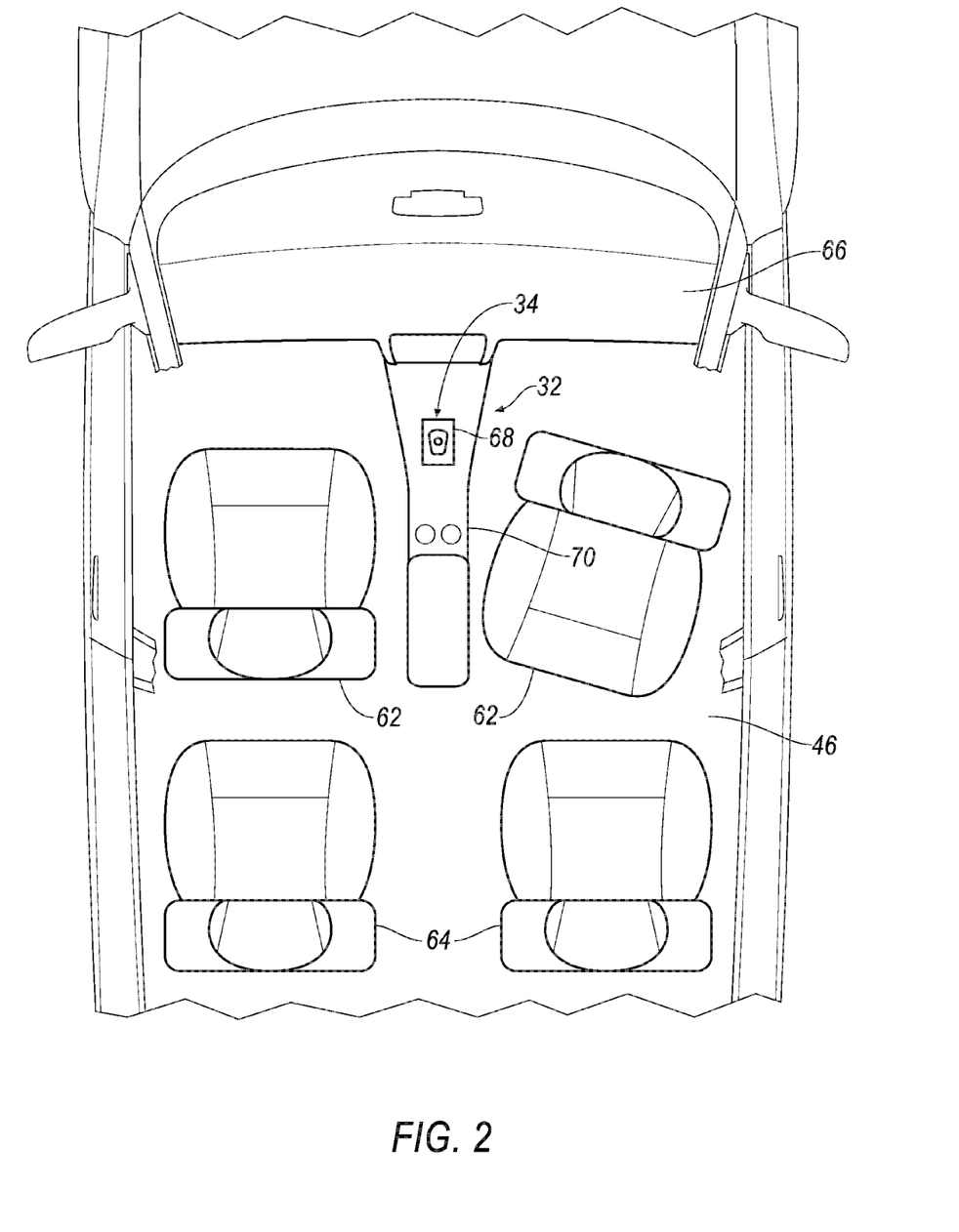
FIG. 2 is a top view of the vehicle with a first example passenger cabin exposed for illustration.
Figure 3:
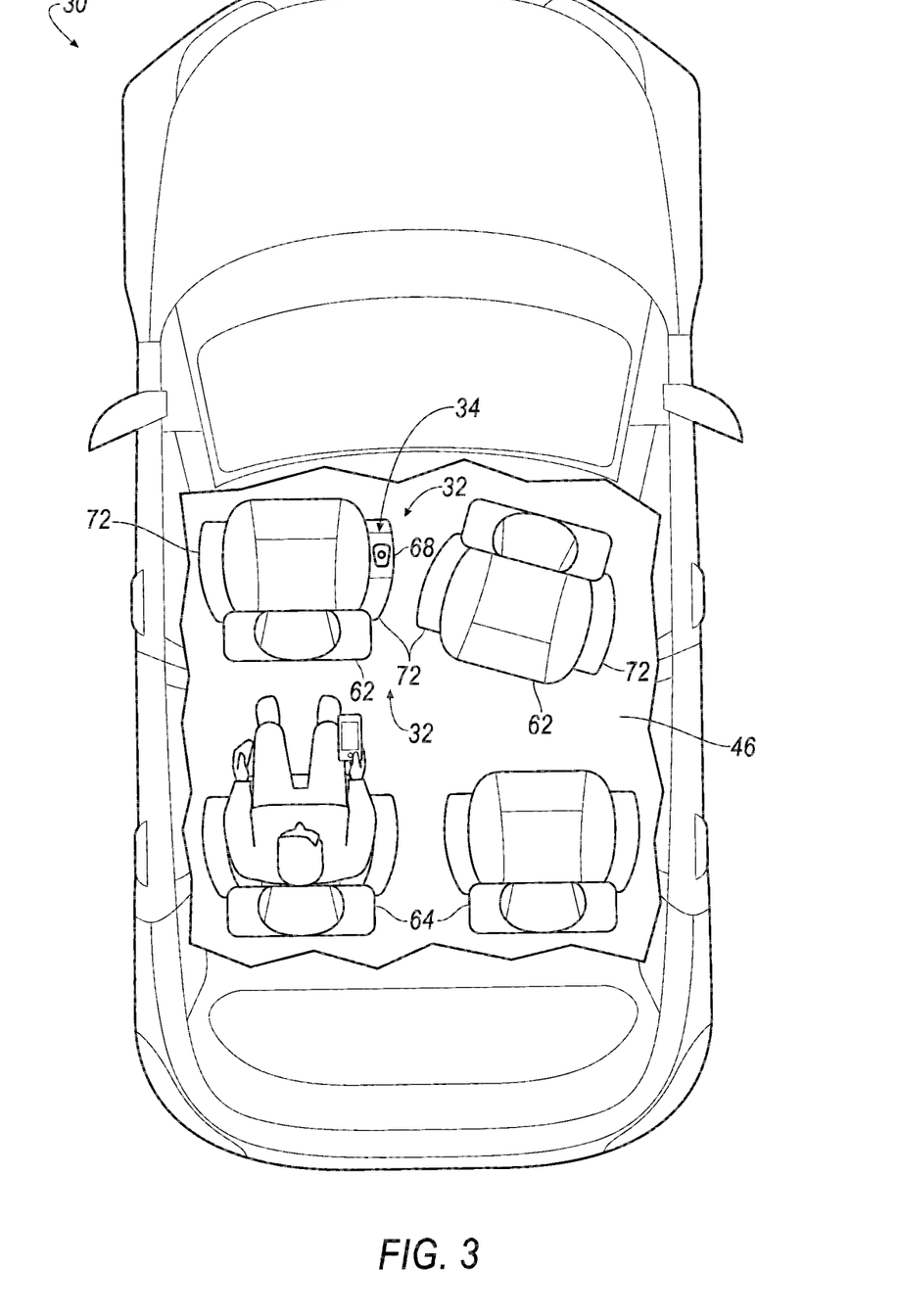
FIG. 3 is a top view of the vehicle with a second example passenger cabin exposed for illustration.

With reference to FIGS. 2 and 3, the vehicle 30 includes the passenger cabin 46 to house occupants, if any, of the vehicle 30. The passenger cabin 46 includes one or more front seats 62 disposed at a front of the passenger cabin 46 and one or more back seats 64 disposed behind the front seats 62. The passenger cabin 46 may also include third-row seats (not shown) at a rear of the passenger cabin 46. In FIGS. 2 and 3, the seats 62, 64 are shown to be bucket seats, but the seats 62, 64 may be other types. The position and orientation of the seats 62, 64 and components thereof may be adjustable by an occupant. In particular, the seats 62, 64 can each be rotatable about a vertical axis. The seats 62, 64 can be oriented facing forward, rearward, or any direction in between.

With reference to FIG. 2, an instrument panel 66 may be disposed at a forward end of the passenger cabin 46 and face toward the front seats 62. The instrument panel 66 may include vehicle controls; gauges, dials, and information displays; heating and ventilation equipment; a radio and other electronics; etc.

With reference to FIGS. 2 and 3, the joystick 34 includes a base 68. The joystick 34 can be mounted to the instrument panel 66, as shown in FIG. 2, or to the seat, as shown in FIG. 3. Specifically, the base 68 is fixed relative to the instrument panel 66 or fixed relative to the seat 62, 64. As shown in FIG. 2, the base 68 can be mounted to a console 70 of the instrument panel 66, and the joystick body 38 can extend upward from the console 70 of the instrument panel 66. The console 70 extends between the front seats 62. As shown in FIG. 3, the base 68 can be mounted to an armrest 72 of the front seat 62, and the joystick body 38 can extend upward from the armrest 72.

With reference to FIGS. 4-7, the joystick 34 includes the base 68, the joystick body 38, the cover 40, a spring 74, the tilt sensors 58, the cover sensor 60, the first input 42, and the second inputs 44.

Figure 5:
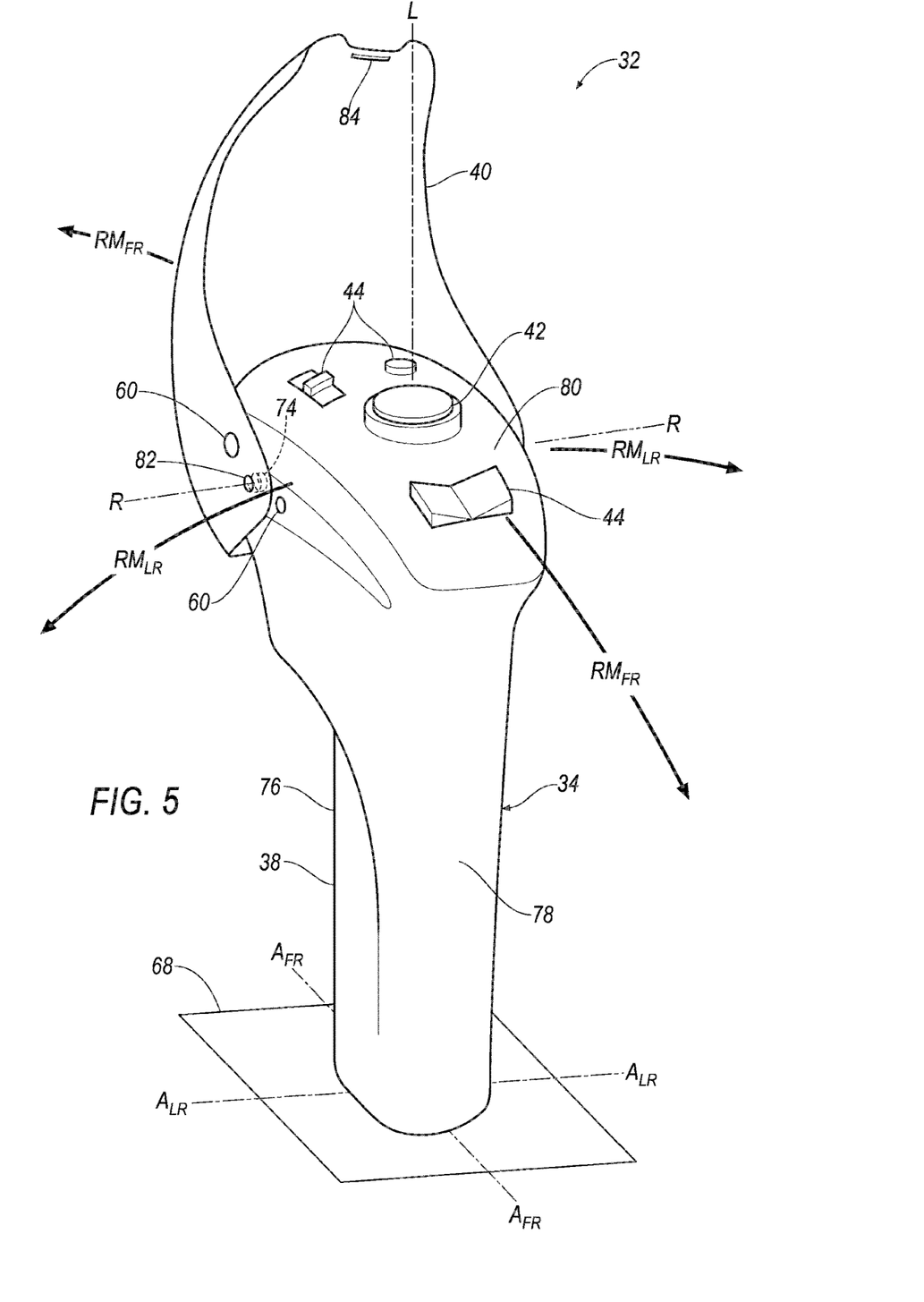
FIG. 5 is a perspective view of the joystick with the cover in an open position.
Figure 7:
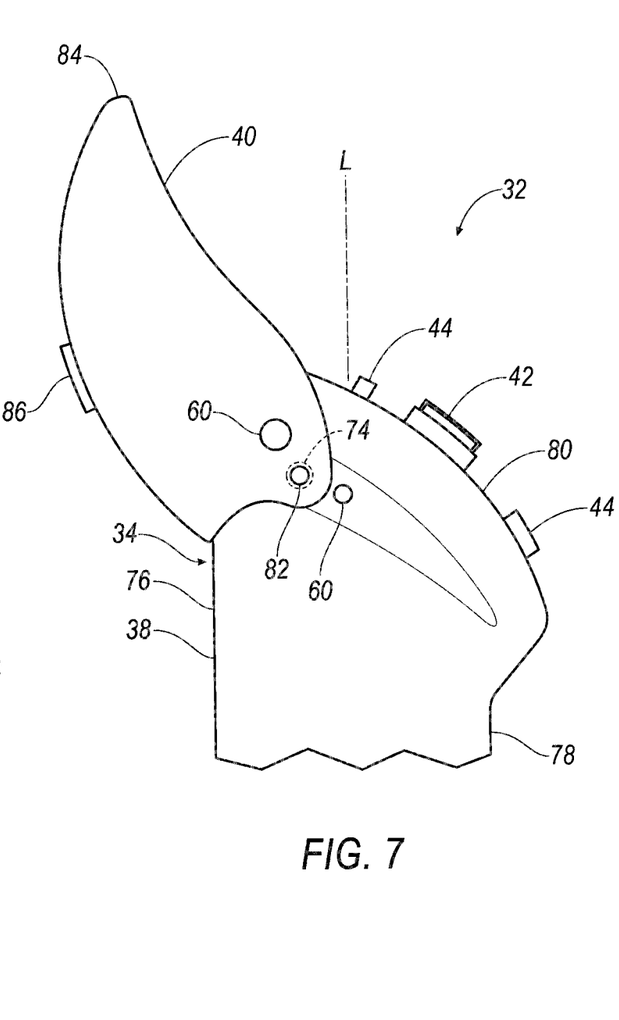
FIG. 7 is a side view of the portion of the joystick with the cover in the open position.

The joystick body 38 includes a front surface 76, a back surface 78, and a top surface 80. "Front," "back," and "top" are measured relative to an occupant gripping the joystick 34, i.e., relative to the vehicle 30 when the base 68 is mounted to the instrument panel 66 and relative to the front seat 62 when the base 68 is mounted to the armrest 72. The joystick body 38 is shaped to be gripped by a hand, with the fingers curling around the front surface 76 and the thumb curling around the back surface 78. The joystick body 38 has a longest length defining a longitudinal axis L. The longitudinal axis L extends in a generally vertical direction. When a hand grips the joystick body 38, the fingers and thumb extend circumferentially around the longitudinal axis L. As shown in FIGS. 5 and 7, the top surface 80 intersects and is transverse to the longitudinal axis L. The top surface 80 is positioned to be accessible to the thumb of a hand that is gripping the joystick body 38.

The joystick body 38 is mounted to and tiltable relative to the base 68. The joystick body 38 can be tilted in two dimensions relative to the base 68, a forward-rearward dimension and a left-right dimension. "Forward," "rearward," "left," and "right" are measured relative to an occupant gripping the joystick 34, i.e., relative to the vehicle 30 when the base 68 is mounted to the instrument panel 66 and relative to the front seat 62 when the base 68 is mounted to the armrest 72. The joystick body 38 is rotatable in the forward-rearward dimension through a forward-rearward range of motion $RM_{FR}$ about a horizontal, left-right axis $A_{LR}$ extending through the base 68, and the joystick body 38 is rotatable in the left-right dimension through a left-right range of motion $RM_{LR}$ about a horizontal, forward-rearward axis $A_{FR}$ extending through the base 68.

The tilt sensors 58 are positioned and configured to measure movement of the joystick body 38 relative to the base 68 in the ranges of motion $RM_{FR}$, $RM_{LR}$. The tilt sensors 58 can be any sensors providing an output mapping onto a position of the joystick body 38, e.g., a capacitive transducer, a capacitive displacement sensor, an eddy-current sensor, an ultrasonic sensor, a Hall effect sensor, an inductive noncontact position sensor, a linear variable differential transformer, a piezoelectric transducer, a potentiometer, a proximity sensor, a linear coder, a rotary encoder, a string potentiometer, etc.

The first input 42 and the second inputs 44 are located on the joystick body 38, specifically on the top surface 80. The first input 42 is positioned to be accessible by the thumb of a hand gripping the joystick body 38, e.g., at a spot accessible by a tip of the thumb when the thumb has a relaxed length. The second inputs 44 are spaced from the first input 42. The first input 42 and each of the second inputs 44 can be a button, a switch, or a touch-sensitive surface, e.g., a capacitive sensor sensitive to skin.

Figure 4:
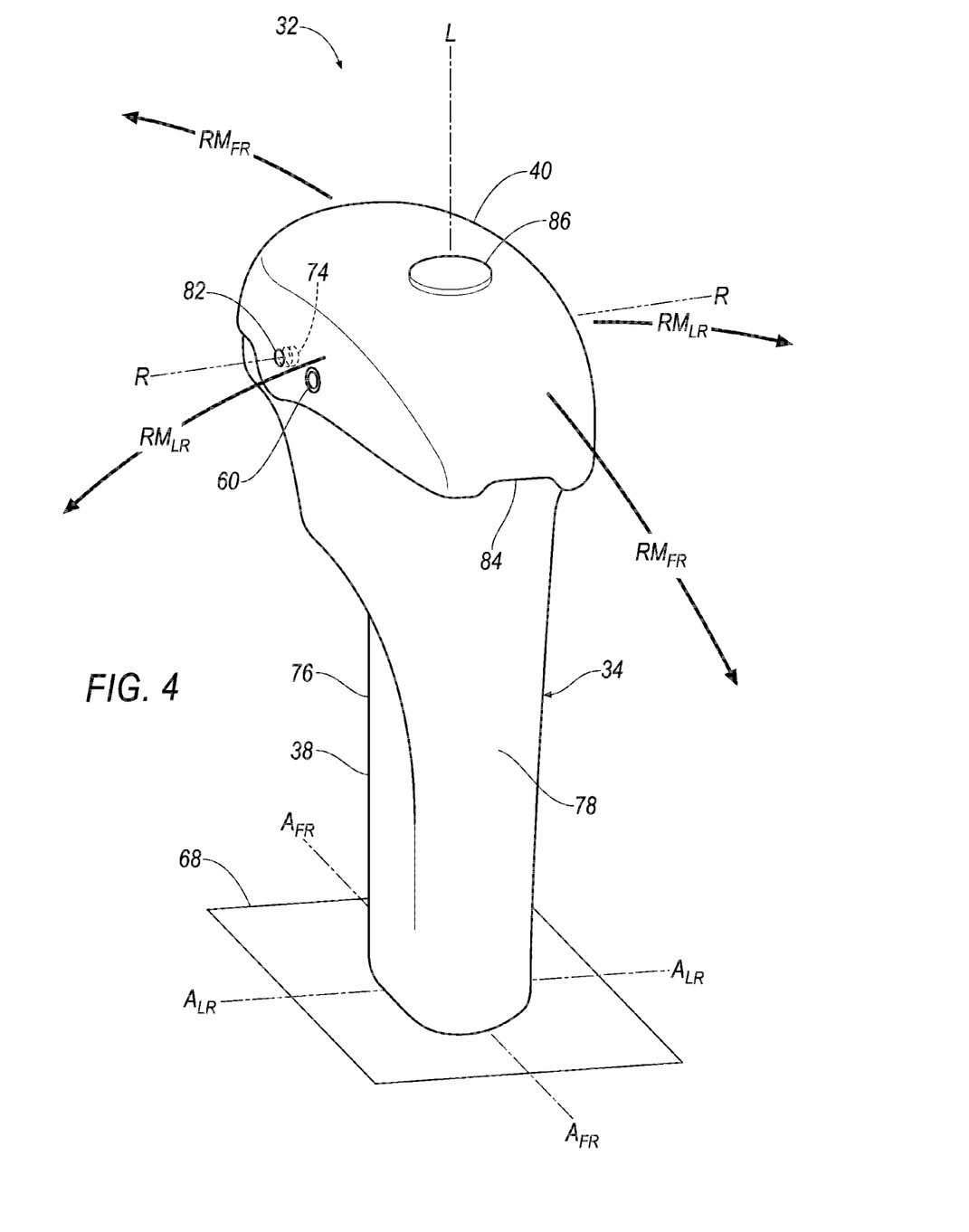
FIG. 4 is a perspective view of a joystick of the vehicle with a cover in a closed position.
Figure 6:
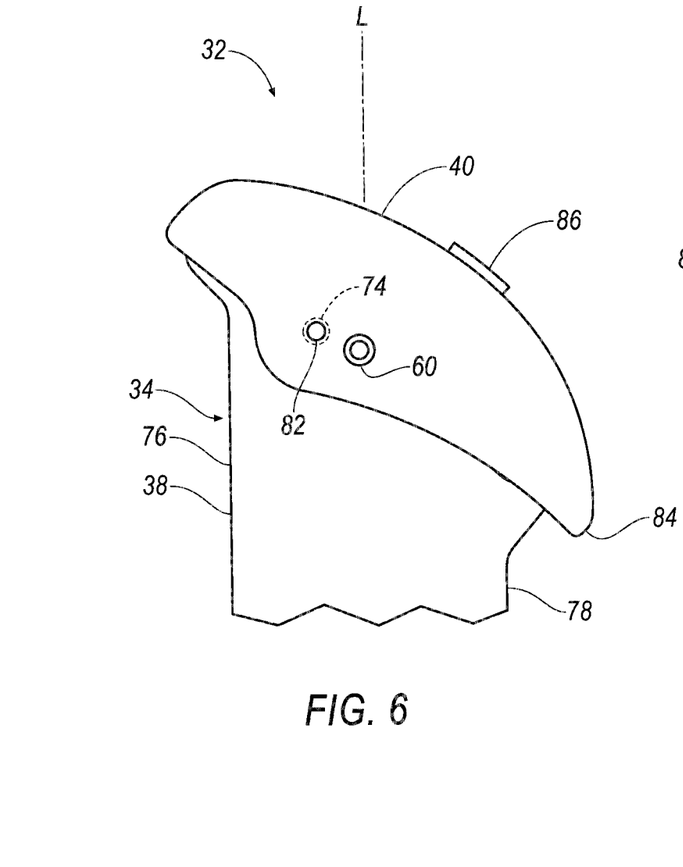
FIG. 6 is a side view of a portion of the joystick with the cover in the closed position.

The cover 40 is hingedly coupled to the joystick body 38, i.e., coupled to the joystick body 38 via a hinge 82. The cover 40 is rotatable relative to the joystick body 38 around a rotation axis R that is transverse to the longitudinal axis L. The rotation axis R is spaced from the longitudinal axis L and disposed forward of the longitudinal axis L. The rotation axis R can be parallel to the left-right axis $A_{LR}$. The cover 40 is movable between an open position, as shown in FIGS. 5 and 7, and a closed position, as shown in FIGS. 4 and 6, by rotating around the rotation axis R. In the closed position, the cover 40 conceals the top surface 80, including concealing the first input 42 and second inputs 44, and the cover 40 intersects the longitudinal axis L. In the open position, the cover 40 exposes the top surface 80, the first input 42, and the second inputs 44, and the cover 40 is spaced from the longitudinal axis L and disposed forward of the longitudinal axis L.

The cover 40 is contoured, i.e., shaped, to conform to the top surface 80 of the joystick body 38 when the cover 40 is in the closed position. When the cover 40 is in the closed position, the cover 40 extends across the top surface 80 to edges extending downward past the top surface 80. The cover 40 includes a clip 84 positioned to hold the cover 40 in the closed position by engaging to the joystick body 38 when the cover 40 is in the closed position.

The joystick 34 includes the spring 74 extending from the joystick body 38 to the cover 40. The spring 74 can be a spiral torsion spring or any other suitable type of spring to exert a rotational force about the rotation axis R when loaded. The spring 74 is positioned to bias the cover 40 to the open position when the cover 40 is in the closed position. When the cover 40 is in the closed position, the spring 74 exerts a torque about the rotation axis R on the cover 40 relative to the joystick body 38 tending to move the cover 40 to the open position. When the cover 40 is in the open position, the spring 74 exerts either no torque or a smaller torque than in the closed position.

The cover sensor 60 is positioned and configured to detect whether the cover 40 is in the open position or in the closed position. For example, the cover sensor 60 can be a positional encoder of any suitable type, e.g., conductive, optical, on-axis magnetic, off-axis magnetic, etc. For another example, the cover sensor 60 can be a mechanical microswitch that, e.g., completes a circuit when the cover 40 is in the closed position and breaks the circuit when the cover 40 is in the open position.

An indicator light 86 is disposed on the cover 40. The indicator light 86 is disposed on an outside surface of the cover 40. The indicator light 86 is positioned to be facing upward when the cover 40 is in the closed position. As described below, the indicator light 86 can display to an occupant which mode the computer 36 is in. The indicator light 86 can be illuminated when the computer 36 is in the first mode and dimmed when the computer 36 is in the second mode.

Figure 8:
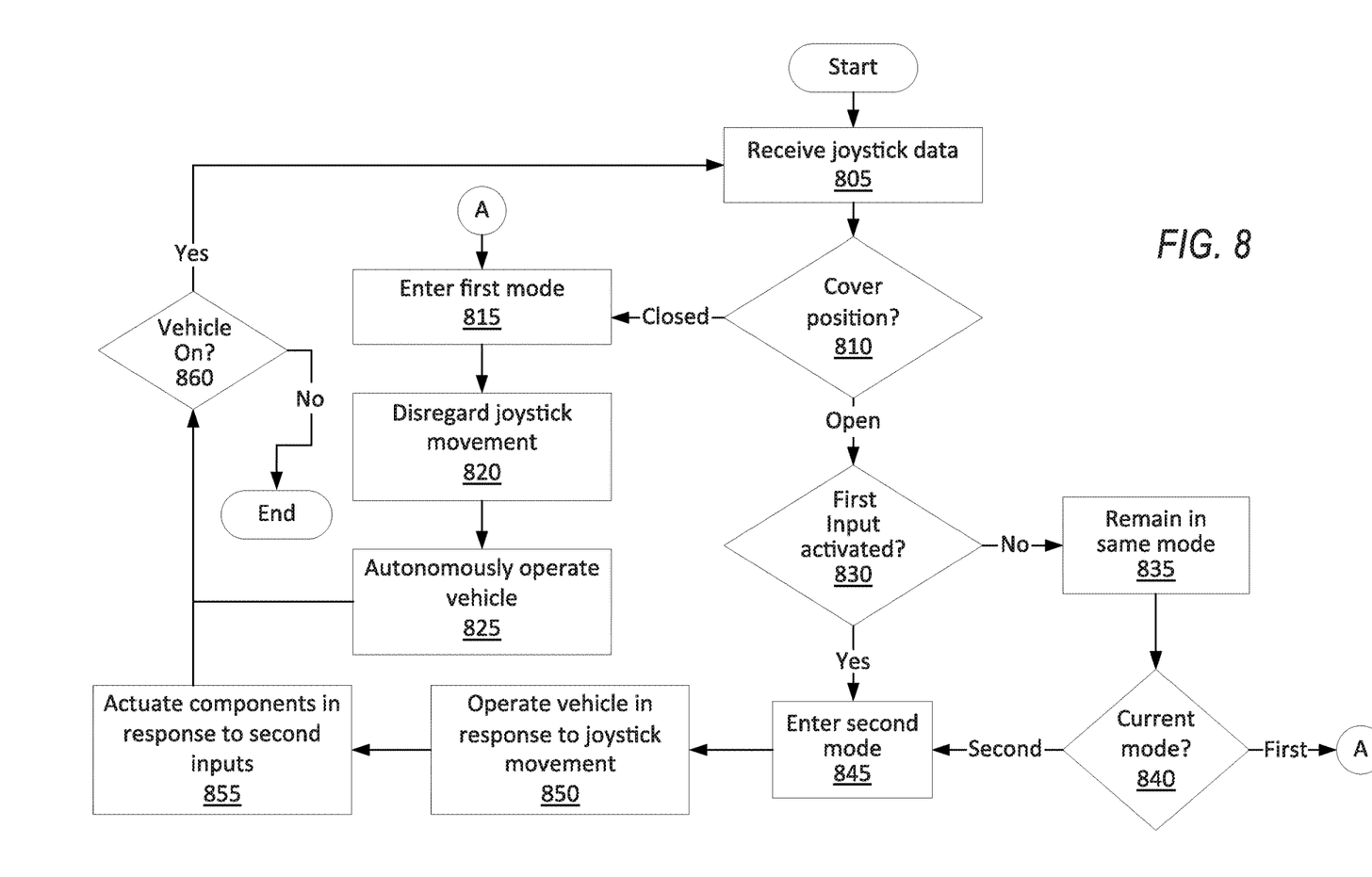
FIG. 8 is a process flow diagram of an example process for operating the vehicle using the joystick.

FIG. 8 is a process flow diagram illustrating an exemplary process 800 for operating the vehicle 30 using the joystick 34. The memory of the computer 36 stores executable instructions for performing the steps of the process 800. As a general overview of the process 800, the computer 36 enters the first mode, i.e., the autonomous mode, in response to closing the cover 40; and enters the second mode, i.e., the semi-autonomous or manual mode, in response to opening the cover 40 and then activating the first input 42; opening the cover 40 but not activating the first input 42 leaves the computer 36 in the same mode as the computer 36 is already in. In the first mode, the computer 36 ignores input from the joystick 34, and in the second mode, the computer 36 responds to input from the joystick 34.

The process 800 begins in a block 805, in which the computer 36 receives input data from the joystick 34, specifically from the tilt sensors 58, the cover sensor 60, the first input 42, and/or the second inputs 44. The data from the tilt sensors 58 can be an ordered pair of numbers mapping onto positions of the joystick body 38 along the forward-rearward range of motion $RM_{FR}$ and along the left-right range of motion $RM_{LR}$. The data from the cover sensor 60 can be a binary value representing the position of the cover 40, i.e., open or closed. The data from the first input 42 can be a binary value representing whether or not the first input 42 is activated. The data from the second inputs 44 can map onto various commands for vehicle systems, as described below with respect to a block 855.

Next, in a decision block 810, the computer 36 determines whether the cover 40 is in the open position or the closed position based on the data from the cover sensor 60, e.g., with a one representing closed and a zero representing open. In response to the cover 40 being closed, the process 800 proceeds to a block 815. In response to the cover 40 being open, the process 800 proceeds to a decision block 830.

In the block 815, the computer 36 enters (or remains in) the first mode. A variable or flag in memory representing the mode can be changed or kept as a value representing the first mode. The indicator light 86 is illuminated.

Next, in a block 820, the computer 36 disregards movement of the joystick body 38, i.e., disregards the data from the tilt sensors 58.

Next, in a block 825, the computer 36 autonomously operates the vehicle 30. As described above, the first mode is the autonomous mode. In particular, the computer 36 operates the propulsion 50, the brake system 52, and the steering system 54 without input from the occupants, i.e., while disregarding input from the joystick 34, based on data from the sensors 56, as is known. After the block 825, the process 800 proceeds to a decision block 860.

In the decision block 830, the computer 36 determines whether the first input 42 is activated based on the data from the first input 42. If the first input 42 is not activated, i.e., in response to the cover 40 moving from the closed position to the open position without the first input 42 being activated, the process 800 proceeds to a block 835. If the first input 42 is activated, i.e., in response to both the cover 40 moving from the closed position to the open position and the first input 42 being activated, the process 800 proceeds to a block 845.

In the block 835, the computer 36 remains in a same of the first and second modes. In other words, if the computer 36 is in the first mode, the computer 36 remains in the first mode, and if the computer 36 is in the second mode, the computer 36 remains in the second mode.

Next, in a decision block 840, the computer 36 determines which mode the computer 36 is in, e.g., by referring the variable or flag storing the current mode in the memory of the computer 36. If the computer 36 is in the first mode, the process 800 proceeds to the block 815, described above. If the computer 36 is in the second mode, the process 800 proceeds to the block 845.

In the block 845, the computer 36 enters (or remains in) the second mode. The variable or flag in memory representing the mode can be changed or kept as a value representing the second mode. The indicator light 86 is dimmed.

Next, in a block 850, the computer 36 operates the vehicle 30, specifically the propulsion 50, the brake system 52, and the steering system 54, in response to movement of the joystick body 38. The data from the tilt sensors 58 can be an ordered pair of numbers mapping onto positions of the joystick body 38 along the forward-rearward range of motion $RM_{FR}$ and along the left-right range of motion $RM_{LR}$. The memory of the computer 36 can store one or more control profiles mapping the data from the tilt sensors 58 to commands for the propulsion 50, brake system 52, and steering system 54. For example, the control profile can map a number representing the position of the joystick body 38 in the left-right range of motion $RM_{LR}$ to an instruction to the steering system 54 to turn the wheels, with tilting the joystick body 38 farther to the right mapping onto turning the wheels of the vehicle 30 more to the right, and vice versa. The control profile can map a number representing the position of the joystick body 38 in the forward-rearward range of motion $RM_{FR}$ to either accelerating with the propulsion 50 or braking with the brake system 52, e.g., tilting the joystick body 38 further forward maps onto accelerating more, and tilting the joystick body 38 further rearward maps onto braking with more force. Other control profiles can map the tilting movement of the joystick body 38 in different ways.

Next, in a block 855, the computer 36 actuates components of the vehicle 30 in response to activation of the second inputs 44. For example, activating one of the second inputs 44 can actuate a light of the vehicle 30, e.g., a turn signal or a headlamp. For another example, activating another one of the second inputs 44 can control wipers of the vehicle 30, e.g., for a windshield. For another example, activating another one of the second inputs 44 can turn a cruise control function on or off.

Next, in the decision block 860, the computer 36 determines whether the vehicle 30 is still on or has been turned off. If the vehicle 30 is still on, the process 800 returns to the block 805 to continue receiving data from the joystick 34. If the vehicle 30 has been turned off, the process 800 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance, order, or quantity. Many modifications and variations of the present disclosure are possible in light of the above teachings, and the disclosure may be practiced otherwise than as specifically described.

What is claimed is:

1. A control system comprising:
    a joystick including a joystick body, a cover hingedly coupled to the joystick body and movable between an open position and a closed position, and an input located on the joystick body, wherein the input is exposed by the cover when the cover is in the open position and concealed by the cover when the cover is in the closed position; and
    a computer communicatively coupled to the joystick and programmed to enter a first mode in response to the cover moving from the open position to the closed position, to enter a second mode in response to both the cover moving from the closed position to the open position and the input being activated, and to remain in a same of the first and second modes in response to the cover moving from the closed position to the open position without the input being activated.

2. The control system of claim 1, wherein the computer is further programmed to disregard movement of the joystick body when the computer is in the first mode.

3. The control system of claim 1, wherein the computer is further programmed to autonomously operate a vehicle when the computer is in the first mode.

4. The control system of claim 1, wherein the computer is further programmed to operate a vehicle in response to movement of the joystick body when the computer is in the second mode.

5. The control system of claim 4, wherein the computer is further programmed to operate a propulsion, a brake system, and a steering system of the vehicle in response to tilting movement of the joystick body when the computer is in the second mode.

6. The control system of claim 1, wherein the input is one of a button, a switch, or a touch-sensitive surface.

7. The control system of claim 1, wherein the input is a first input, and the joystick includes a second input located on the joystick body, wherein the second input is exposed by the cover when the cover is in the open position and concealed by the cover when the cover is in the closed position.

8. The control system of claim 7, wherein the computer is further programmed to, in response to activation of the second input, actuate a light of a vehicle, wipers of the vehicle, or a cruise control of the vehicle.

9. The control system of claim 1, wherein the joystick includes a spring extending from the joystick body to the cover, wherein the spring is positioned to bias the cover to the open position when the cover is in the closed position.

10. The control system of claim 1, wherein the joystick body has a longest length defining a longitudinal axis, and the cover is rotatable relative to the joystick body around a rotation axis that is transverse to the longitudinal axis.

11. The control system of claim 1, wherein the joystick body has a longest length defining a longitudinal axis, and the cover intersects the longitudinal axis when the cover is in the closed position and is spaced from the longitudinal axis when the cover is in the open position.

12. The control system of claim 1, further comprising a seat rotatable about a vertical axis, wherein the joystick includes a base fixed relative to the seat, and the joystick body is mounted to and tiltable relative to the base.

13. The control system of claim 1, further comprising an instrument panel, wherein the joystick includes a base fixed relative to the instrument panel, and the joystick body is mounted to and tiltable relative to the base.

14. A computer comprising a processor and a memory storing instructions executable by the processor to:
enter a first mode in response to a cover hingedly coupled to a joystick body moving from an open position to a closed position;
enter a second mode in response to both the cover moving from the closed position to the open position and an input located on the joystick body being activated, wherein the input is exposed by the cover when the cover is in the open position and concealed by the cover when the cover is in the closed position; and
remain in a same of the first and second modes in response to the cover moving from the closed position to the open position without the input being activated.

15. The computer of claim 14, wherein the instructions further include to disregard movement of the joystick body when the computer is in the first mode.

16. The computer of claim 14, wherein the instructions further include to autonomously operate a vehicle when the computer is in the first mode.

17. The computer of claim 14, wherein the instructions further include to operate a vehicle in response to movement of the joystick body when the computer is in the second mode.

18. The computer of claim 17, wherein the instructions further include to operate a propulsion, a brake system, and a steering system of the vehicle in response to tilting movement of the joystick body when the computer is in the second mode.

19. A method comprising:
putting a computer into a first mode in response to a cover hingedly coupled to a joystick body moving from an open position to a closed position;
putting a computer into a second mode in response to both the cover moving from the closed position to the open position and an input located on the joystick body being activated, wherein the input is exposed by the cover when the cover is in the open position and concealed by the cover when the cover is in the closed position; and
keeping the computer in a same of the first and second modes in response to the cover moving from the closed position to the open position without the input being activated.

* * * * *